Oct. 30, 1934.  A. G. LEGGE  1,978,496
TREE FOR BOOTS
Filed Aug. 16, 1933  2 Sheets-Sheet 1
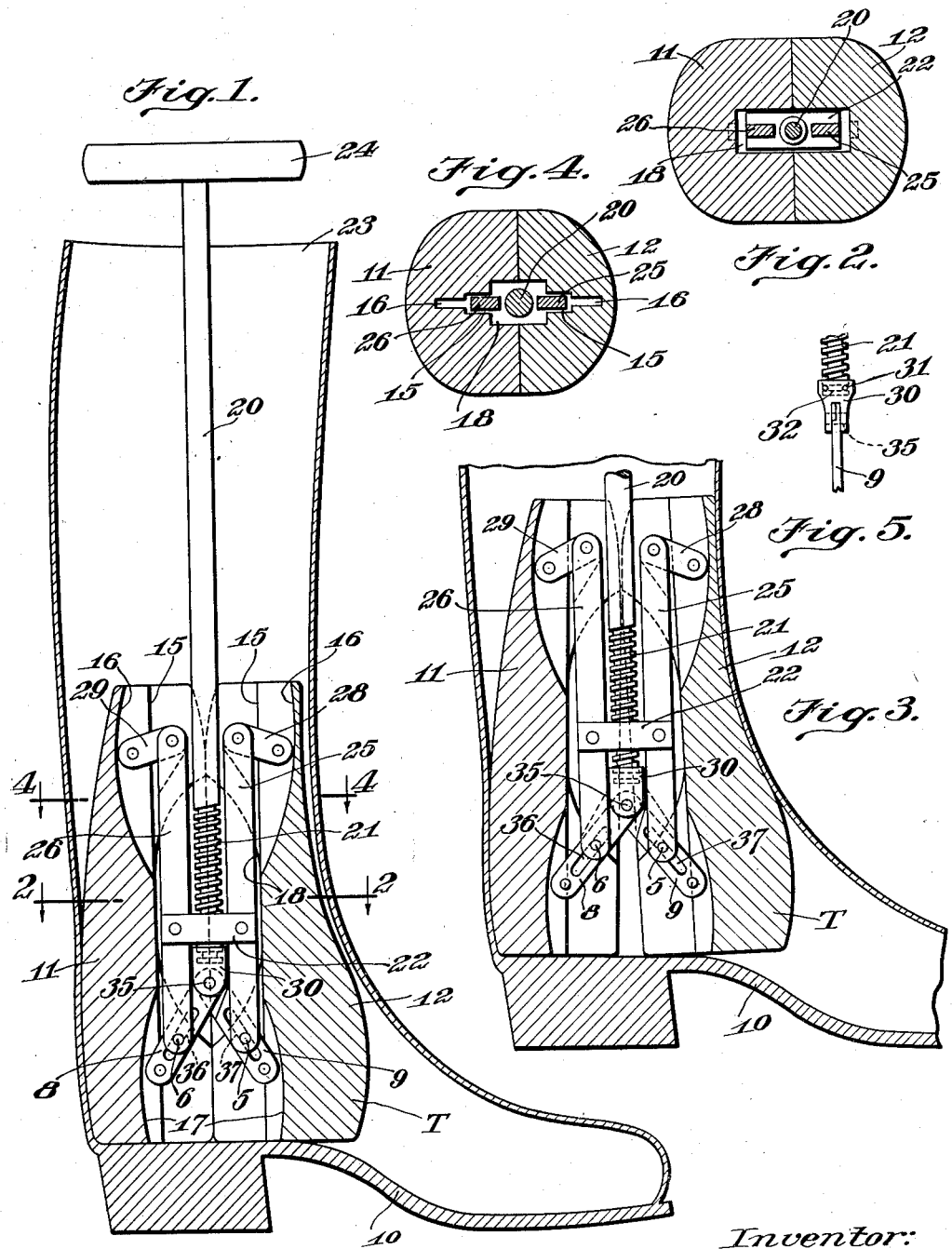
Inventor:
Alfred G. Legge
by Macleod, Calver, Copeland + Dike
Attys.

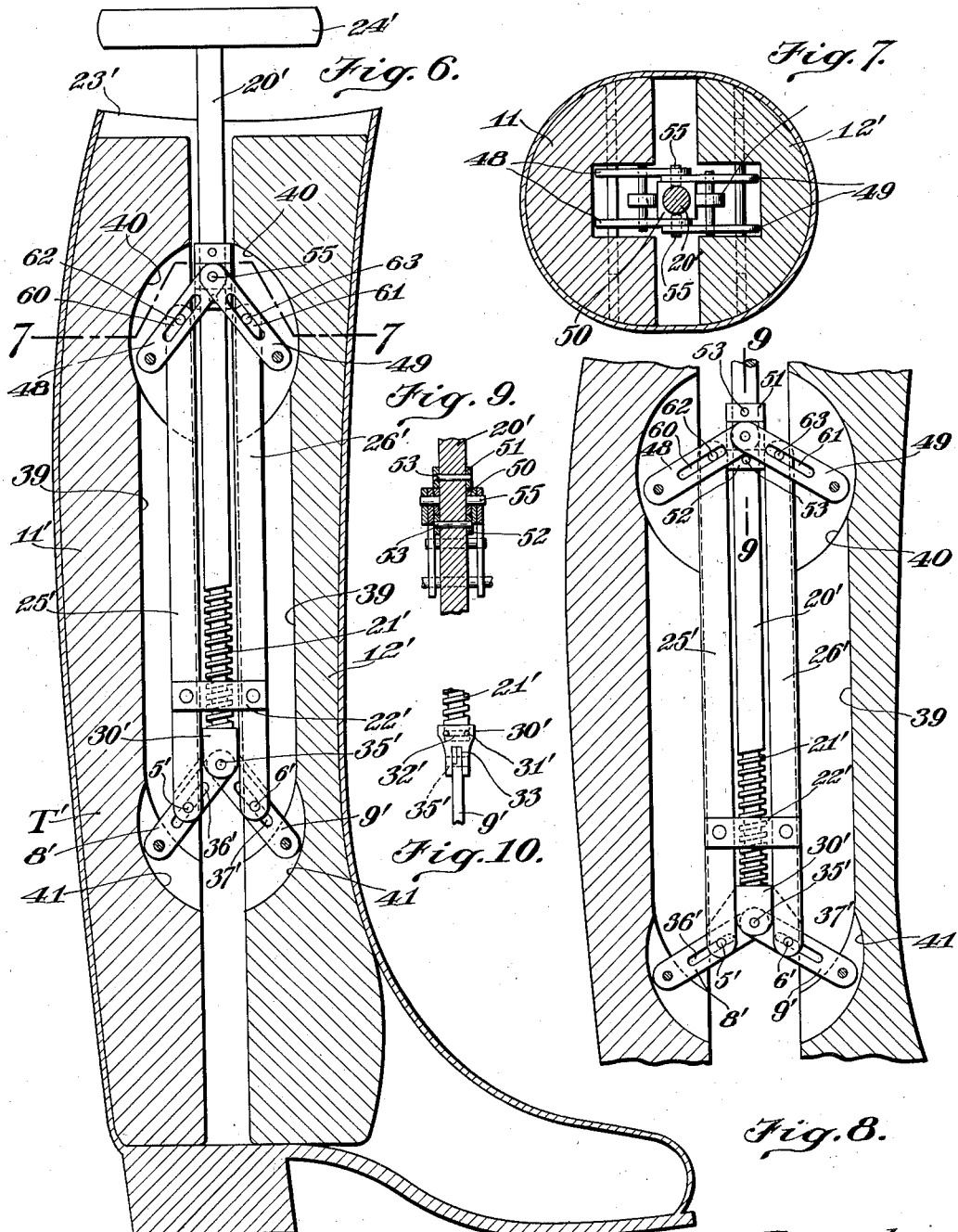

Patented Oct. 30, 1934

1,978,496

UNITED STATES PATENT OFFICE 1,978,496

TREE FOR BOOTS

Alfred G. Legge, Brockton, Mass.

Application August 16, 1933, Serial No. 685,373

3 Claims. (Cl. 12—116)

This invention relates to trees for boots and particularly to trees for stretching the uppers of boots.

Trees of this general type usually comprise a pair of blocks, usually of wood, the outer surfaces of which are shaped to conform generally with the inner surface of the boot upper. The blocks may be moved apart against the boot upper by a pair of devices connected to the blocks at correspondingly spaced points. These expanding devices are actuated by a screw positioned between the inner surfaces of the blocks and adapted to extend through the opening in the top of the boot upper so that it may be manually operated from outside the boot. Considerable difficulty has been experienced with these trees because the pair of expanding devices usually would not operate in unison. Consequently, only one end of the tree would be expanded against the boot upper. It often happened that the end expanded would be the one positioned farthest from the portion of the boot needing stretching. As a result, it has been necessary, in using these trees, to reposition the trees in the boots several times to obtain the necessary and desired location.

It is an object of the present invention to overcome these difficulties.

Another object of the invention is the provision of a tree, the upper and lower portions of which may be expanded positively and in unison.

The invention will be more clearly understood from the following description in conjunction with the accompanying drawings: in which, Fig. 1 is a sectional elevation view of a boot in which a tree embodying the invention is positioned and contracted;

Fig. 2 is a sectional view taken upon the line 2—2 of Fig. 1;

Fig. 3 is a fragmentary sectional elevational view of a boot showing the tree of the invention expanded therein;

Fig. 4 is a sectional view taken upon the line 4—4 of Fig. 1;

Fig. 5 is a fragmentary detail elevational view of a portion of the tree shown in Fig. 1;

Fig. 6 is a sectional elevational view of a boot in which a modified form of tree is positioned partially expanded;

Fig. 7 is a sectional view taken upon the line 7—7 of Fig. 6;

Fig. 8 is a fragmentary sectional elevational view of the tree shown in Fig. 6 in its expanded position;

Fig. 9 is a sectional view taken upon the line 9—9 of Fig. 8; and

Fig. 10 is a fragmentary detail elevational view of a portion of a tree shown in Fig. 6.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring to Figs. 1 to 5 inclusive of the accompanying drawings, a boot 10 is illustrated having positioned therein a tree T embodying the invention. The tree T comprises a pair of blocks 11 and 12 shaped to conform generally and respectively to the rear and front half of the boot upper. The inner or adjacent surfaces of the blocks 11 and 12 are each provided with a slot 15 extending the entire length of the blocks. Grooves 16 and 17 are provided adjacent the upper and lower ends of the blocks. A groove 18 is also provided in each of the blocks 11 and 12 intermediate the ends thereof. A screw 20 is positioned between the blocks in the space provided by the corresponding slots 15 and its threaded portion 21 is adapted to engage a nut 22. The nut 22 extends between and into the cooperating grooves 18 and is slidably positioned therein. The screw 20 extends longitudinally of the tree T and through the opening 23 in the top of the upper of the boot 10 and is provided at its outer end with a handle 24 by which it may be manually turned. The front and rear portions of the nut 22 are each provided with a slot in which members 25 and 26 respectively are suitably secured. The members 25 and 26 extend longitudinally of the tree so that their upper and lower ends are positioned near the upper and lower ends of the tree. One end of links 28 and 29 are pivotally secured to the upper ends of the members 25 and 26 respectively. The links 28 and 29 extend into the grooves 16 and are pivotally connected at their other ends to blocks 11 and 12 respectively.

A swivel member 30 is provided with a recess adapted to receive the lower end of the screw 20 and is secured thereto by pins 31 extending through the member 30 and into a groove 32 in the screw 20. The member 30 is connected to the blocks 11 and 12 by links 8 and 9 respectively. As shown, the lower end of the member 30 is provided with a slot 33 in which one end of each of the links 8 and 9 is pivotally secured, as by a pin 35. The other ends of the links 8 and 9 extend into the grooves 16 and are pivotally connected to the blocks 11 and 12. The links 8 and 9 are provided with elongated slots 36 and 37 respectively intermediate their ends adapted to receive pins 5 and 6 extending from the lower ends of the members 25 and 26 respectively.

The tree illustrated in Figs. 1 to 5 is adapted for stretching the ankle portion of the boot upper. It is inserted through the opening 23 in the upper of the boot 10 until its lower end rests upon the insole of the boot. The screw 20 is then turned to cause the member 30 to move downwardly in the boot. In so doing it will be noted that the links 8 and 9 are caused to pivot about and slide upon the pins 6 and 5 thereby causing the lower ends of the blocks 11 and 12 to move apart into engagement with the ankle portion of the boot upper. At the same time the nut 22 moves downwardly at a slower rate than the member 30 thereby swinging the links 28 in the same direction as the links 8 and 9 and causing the upper ends of the blocks 11 and 12 to be moved away from one another.

In Figs. 6 to 10 inclusive a modified form of tree T' is illustrated which is particularly adapted for stretching substantially the entire leg portion of the upper of the boot as well as the ankle portion. The tree T' comprises blocks 11' and 12' each provided with corresponding upper and lower grooves 40 and 41 and corresponding intermediate grooves 39. A screw 20' is positioned between the inner surfaces of the blocks 11' and 12' and its threaded portion 21' is adapted to engage a nut 22'. The nut 22' extends between and into the corresponding grooves 39 and is slidably positioned therein. The screw 20' extends longitudinally of the tree T' and through the opening 23' at the top of the upper of the boot 10' and is provided at its outer end with a handle 24' by which it may be manually turned. The front and rear portions of the nut 22' are each provided with a slot in which members 25' and 26' are suitably secured. The members 25' and 26' extend longitudinally of the tree so that their upper and lower ends are positioned near the upper and lower ends of the tree.

A swivel member 30' is provided with a recess adapted to receive the lower end of the screw 20' and is secured thereto by pins 31' extending through the member 30' and into a groove 32' in the screw 20'. The member 30' is connected to the blocks 11' and 12' by links 8' and 9' respectively. As shown, the lower end of the member 30' is provided with a slot 33' in which one end of each of the links 8' and 9' is pivotally secured, as by a pin 35'. The other ends of the links 8' and 9' are pivotally connected to the blocks 11' and 12' respectively. The links 8' and 9' are provided with elongated slots 36' and 37' intermediate their ends adapted to receive pins 5' and 6' extending from the lower ends of the members 25' and 26' respectively.

A collar 50 is rotatably mounted upon the shaft of the screw 20' between the collars 51 and 52 which are secured to the screw, as by pins 53. The collar 50 is connected to the blocks 11' and 12' by links 48 and 49 respectively. As shown, one end of each of the links 48 and 49 is pivotally secured to the collar 50, as by pins 55. The other ends of the links 48 extend into the slots 40 in the block 11' and are pivotally connected thereto, while the other ends of the links 49 extend into the slots 40 in the block 12' and are pivotally connected thereto. The links 48 and 49 are provided with elongated slots 60 and 61 intermediate their ends adapted to receive pins 62 and 63 extending from the upper ends of the members 25' and 26' respectively.

In use the tree T' is inserted through the opening in the upper of the boot until its lower end rests upon the insole of the boot. The screw 20' is then turned to cause the member 30' and the collar 50 to move downwardly in the boot. In so doing it will be noted that the links 8' and 9' are caused to pivot about and slide upon the pins 5' and 6' and the links 48 and 49 are caused to pivot about and slide upon the pins 62 and 63 thereby causing the upper and lower ends of the blocks to move apart at equal rates into engagement with the boot upper.

I claim:

1. A boot stretching device comprising a pair of blocks, a screw between said blocks, a nut between said blocks engaged by said screw, members carried by said nut positioned between said screw and each of said blocks and extending longitudinally of said device, spaced corresponding links pivotally connected to each of said blocks, a mounting upon said screw movable longitudinally therewith and rotatable relative thereto, one of said corresponding pairs of links being pivotally connected to said mounting and pivotally and longitudinally movable upon said members, the other of said corresponding pairs of links being pivotally connected to said members.

2. A boot stretching device comprising a pair of blocks, a screw between said blocks, a nut between said blocks engaged by said screw, a member carried by said nut and positioned between said screw and each of said blocks and extending longitudinally of said device, a pair of links pivotally connected at their outer ends to said blocks, a mounting upon said screw movable longitudinally therewith and rotatable relative thereto, said pair of links being pivotally connected at their other ends to said mounting and pivotally and longitudinally movable upon said members, and another pair of links pivotally connected at their outer ends to said blocks and at their inner ends to said members.

3. A boot stretching device comprising a pair of blocks, a screw between said blocks, a nut between said blocks engaged by said screw, members carried by said nut positioned between said screw and each of said blocks and extending longitudinally of said device, spaced corresponding links pivotally connected to each of said blocks, a pair of mountings upon said screw movable longitudinally therewith and rotatable relative thereto, one of said corresponding pairs of links being pivotally connected to one of said mountings, the other of said corresponding pairs of links being pivotally connected to the other mounting, each of said corresponding pairs of links being pivotally and longitudinally movable upon said members.

ALFRED G. LEGGE.